(12) United States Patent
Jo et al.

(10) Patent No.: US 9,982,706 B2
(45) Date of Patent: May 29, 2018

(54) METHOD OF MANUFACTURING LIGHT ROTOR SHAFT FOR ECO-FRIENDLY VEHICLES

(71) Applicant: Hyundai Motor Company, Seoul (KR)

(72) Inventors: Bong Lae Jo, Gyeonggi-Do (KR); Hye Min Jo, Seoul (KR)

(73) Assignee: Hyundai Motor Company, Seoul (KR)

( * ) Notice: Subject to any disclaimer, the term of this patent is extended or adjusted under 35 U.S.C. 154(b) by 134 days.

(21) Appl. No.: 14/937,956

(22) Filed: Nov. 11, 2015

(65) Prior Publication Data

US 2017/0030398 A1    Feb. 2, 2017

(30) Foreign Application Priority Data

Jul. 31, 2015 (KR) ..................... 10-2015-0108789

(51) Int. Cl.
*F16C 3/02* (2006.01)
*B21K 1/06* (2006.01)
(Continued)

(52) U.S. Cl.
CPC ............ *F16C 3/02* (2013.01); *B21J 7/14* (2013.01); *B21J 13/00* (2013.01); *B21K 1/063* (2013.01);
(Continued)

(58) Field of Classification Search
CPC ..... B21J 5/008; B21J 5/02; B21J 5/022; B21J 5/025; B21J 5/027; B21J 5/08; B21J 5/10;
(Continued)

(56) References Cited

U.S. PATENT DOCUMENTS 3,120,137 A * 2/1964 Braatz ............... B21J 7/16
                                                    72/343
4,845,972 A * 7/1989 Takeuchi ........... B21J 5/08
                                                    72/306
(Continued)

FOREIGN PATENT DOCUMENTS

GB            800050 A * 8/1958 ............... B21J 7/14
JP      H10291008 A   11/1998
(Continued)

OTHER PUBLICATIONS

Machine translation of WO 2015044120, Translated Aug. 25, 2017, 5 Pages.*

*Primary Examiner* — Teresa M Ekiert
*Assistant Examiner* — Gregory Swiatocha
(74) *Attorney, Agent, or Firm* — Mintz Levin Cohn Ferris Glovsky and Popeo, P.C.; Peter F. Corless

(57) ABSTRACT

A method of manufacturing a light rotor shaft for eco-friendly vehicles is provided which includes cutting a pipe material in a specified length to provide a pipe blank and forming the pipe blank to provide a first form having the first segment on a first side. The method further includes, forming a second form having the second segment by inserting and rotating a first side of a mandrel into the first side of the first form and concurrently hammer-forging the second side of the first form to form the second segment. The rotor shaft includes a third segment formed by inserting and rotating the second side of the mandrel into the first side of the second form to form the third segment.

5 Claims, 5 Drawing Sheets

(51) Int. Cl.
  *B21J 7/14* (2006.01)
  *B21J 13/00* (2006.01)
  *B23P 15/00* (2006.01)
  *B21J 5/10* (2006.01)
  *B21J 5/12* (2006.01)
  *B21J 9/02* (2006.01)

(52) U.S. Cl.
  CPC ............... *B23P 15/00* (2013.01); *B21J 5/10* (2013.01); *B21J 5/12* (2013.01); *B21J 9/022* (2013.01); *B21J 9/027* (2013.01); *F16C 2326/06* (2013.01)

(58) Field of Classification Search
  CPC ....... B21J 5/12; B21J 9/02–9/08; B21J 13/12; B21J 13/02; B21J 13/03; B21J 13/085; B21D 37/06; B21D 37/08; B21K 1/063
  See application file for complete search history.

(56) References Cited

U.S. PATENT DOCUMENTS

| | | | | |
|---|---|---|---|---|
| 5,522,246 A | * | 6/1996 | Simon | B21C 25/08 72/260 |
| 6,439,672 B1 | * | 8/2002 | Simon | B60B 35/04 301/124.1 |
| 6,758,077 B2 | * | 7/2004 | Kaneko | B21D 22/16 72/370.01 |
| 7,412,866 B2 | * | 8/2008 | Jahani | B21C 25/08 301/124.1 |
| 7,644,601 B2 | * | 1/2010 | Brochheuser | B21C 1/24 72/283 |
| 2004/0060385 A1 | * | 4/2004 | Prucher | B21C 37/16 74/607 |
| 2010/0308612 A1 | * | 12/2010 | Antunes | B21J 5/08 295/36.1 |

FOREIGN PATENT DOCUMENTS

| | | | |
|---|---|---|---|
| JP | 2008-520440 A | 6/2008 | |
| KR | 2005-0042816 A | 5/2005 | |
| KR | 10-1206742 B1 | 11/2012 | |
| KR | 10-2013-0013053 A | 2/2013 | |
| KR | 10-1273225 B1 | 6/2013 | |
| KR | 2014-0022226 A | 2/2014 | |
| WO | WO 2015044120 A1 | * 4/2015 | ............ B21J 7/14 |

* cited by examiner

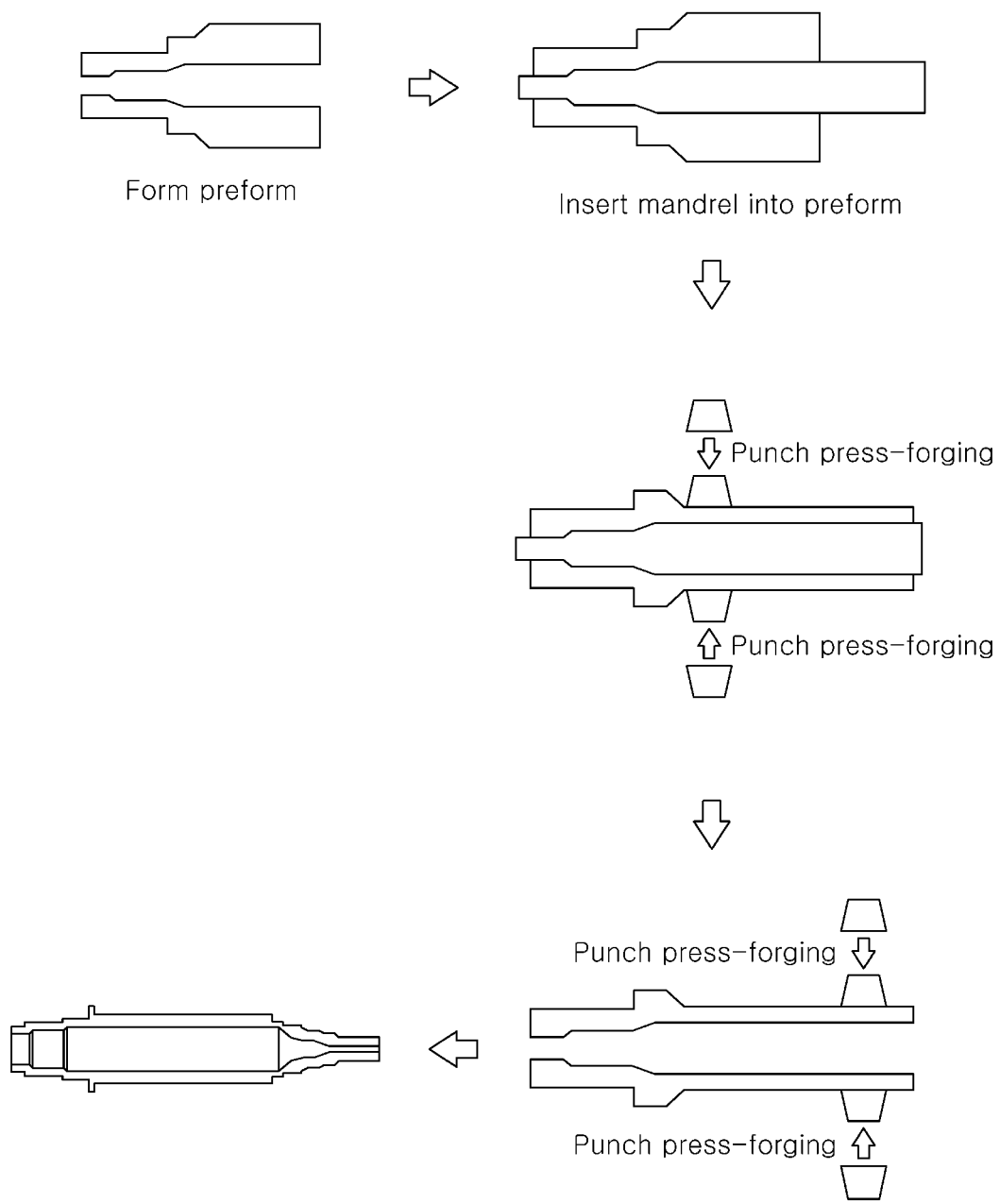

"A"

METHOD OF MANUFACTURING LIGHT ROTOR SHAFT FOR ECO-FRIENDLY VEHICLES

CROSS REFERENCE TO RELATED APPLICATION

The present application claims priority to Korean Patent Application No. 10-2015-0108789, filed Jul. 31, 2015, the entire contents of which is incorporated herein for all purposes by this reference.

BACKGROUND

Field of the Invention

The present invention generally relates to a method of manufacturing a light rotor shaft for eco-friendly vehicles and, more particularly, to a method of manufacturing a light rotor shaft for eco-friendly vehicles, which is formed to have stepped inner and outer diameters to reduce rear remnants.

Description of the Related Art

Recently, as environmental problems have emerged as a global issue, research into vehicle technologies that reduce exhaust emissions and improve fuel efficiency have been actively conducted. Generally, eco-friendly vehicles such as hybrid vehicles, electric vehicles, fuel-cell vehicles, or the like have been studied. Typically, eco-friendly vehicles are driven by a motor that is electrically powered from a battery to produce rotary drive power. The rotary drive power is in turn transmitted to the axles via a reducer (e.g., transmission). To improve fuel efficiency and development of eco-friendly products, the operation efficiency of high-capacity motors of eco-friendly vehicles should be improved. Improvement in the fuel efficiency of such vehicles may be achieved by producing a light rotor shaft for the motor.

FIGS. 1A and 1B are exemplary cross-sectional views showing a conventional hollow rotor shaft according to the related art. As shown in FIGS. 1A and 1B, the rotor shaft is formed into a hollow-type body to reduce the weight-of the shaft. However, the rotor shaft has a constant inner diameter, so a middle portion thereof is required to be thick, which contributes to an increased weight. Conventional methods to reduce the weight include radial forging to form a hollow body having stepped inner and out diameters.

FIG. 2 illustrates an exemplary schematic illustrating the conventional radial forging method according to the related art. FIGS. 3A and 3B illustrate exemplary cross-sectional views, including a defective folded section of a hollow body manufactured using the radial forging method according to the related art. As shown in FIGS. 2 and 3A and 3B, the radial forging method includes forming a preform, inserting a mandrel into the preform first press-forging an outer diameter part of the perform, into which the mandrel has been inserted, to draw the outer diameter part in one direction. The mandrel is removed and the outer diameter part is then second press-forging, thereby forming a hollow product. However, in the second press-forging the outer diameter part while removing the mandrel as shown in FIG. 3B, a problem arises. In particular, an inner diameter part is compressed and shrinks, causing the opposing surfaces of a rear circumference to adhere to each other, thereby forming a rear remnant (A), which adversely affects weight-reduction of a product. Further, such a rear remnant attributed to surfaces sticking has an elevated stress-concentration, potentially contributing to a premature failure.

The above information disclosed in this section is intended merely to aid in the understanding of the background of the invention, and therefore may contain information that does not form the prior art that is already known to a person of ordinary skill in the art.

SUMMARY

The present invention provides a method of manufacturing a light rotor shaft by forming the rotor shaft to include stepped inner and outer diameters while reducing the occurrence of a rear remnant. The method of manufacturing further provides a light rotor shaft having improved durability via improved mechanical properties including fatigue strength and the like.

In one aspect of the present invention provides, a method of manufacturing a light rotor shaft for eco-friendly vehicles, wherein the rotor shaft may include a hollow main body longitudinally divided into first, second, and third segments. The inner diameters of the first and third segments may be less than an inner diameter of the second segment. Further the method may include cutting a pipe material in a specified length to provide a pipe blank, forming the pipe blank to provide a first form that has the first segment on one side thereof and a second form that may form the second segment by inserting and rotating a first side of a mandrel into one side of the first form towards the first segment and concurrently hammer-forging the second side of the first form to form the second segment. Further forming the rotor shaft may include forming the third segment by inserting and rotating the second side of the mandrel into one side of the second form towards the second segment to form the third segment.

In some exemplary embodiments, during the first to third forming stages the first and third segments may have stepped inner and outer diameters that gradually decrease towards respective ends thereof. In the first to third forming stages, the inner diameters of the first to third segments may be formed to adjust in dimension corresponding to a variance of the outer diameters of the first to third segments.

In other exemplary embodiment the first side of the mandrel may have a shape that corresponds to the inner diameter of the first segment, and the second side of the mandrel may have a shape that corresponds to the inner diameter of the third segment. The method may further include, performing an RF heat-treatment and a surface treatment on the rotor shaft. According to an exemplary embodiment, a stepped hollow-type rotor shaft may be formed to include a sustainably constant thickness, thereby obtaining considerable weight-reduction. Additionally, the occurrence of a rear remnant may be reduced, thus preventing stress-concentration, and improving durability of a product. Further, in forming a product, the separate bonding process may be eliminated, thereby reducing manufacturing cost, improving quality of a product attributed to a seamless manufacturing process, and improving durability of a product.

BRIEF DESCRIPTION OF THE DRAWINGS

The above and other objects, features and other advantages of the present disclosure will be more clearly understood from the following detailed description when taken in conjunction with the accompanying drawings:

FIG. 2 is an exemplary schematic view of a conventional radial forging process according to the related art;

DETAILED DESCRIPTION

Figure 1A:
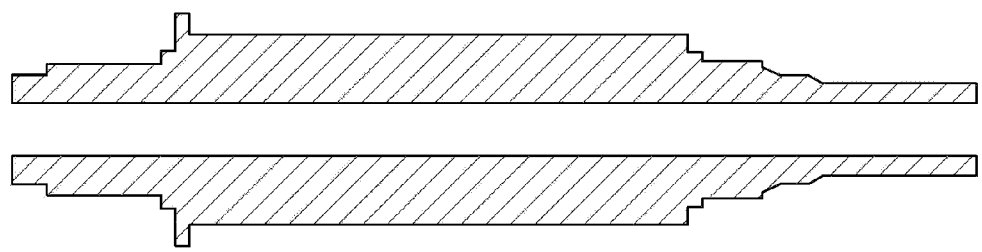
FIGS. 1A and 1B are an exemplary cross-sectional view of a conventional hollow-type rotor shaft according to the related art.
Figure 1B:
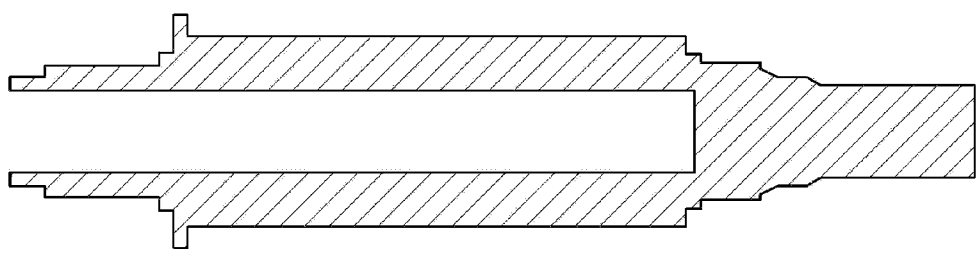
Figure 3A:
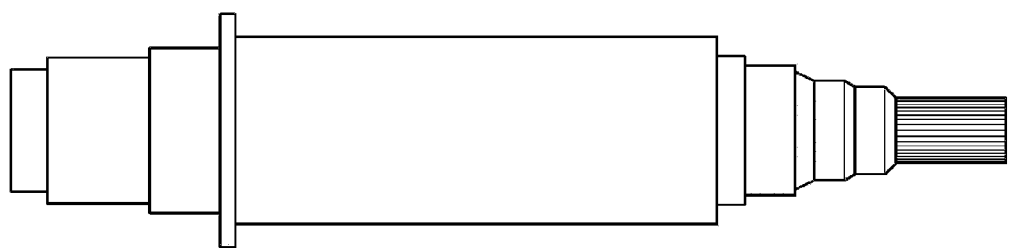
FIGS. 3A and 3B are an exemplary view of a hollow body manufactured by the conventional radial forging process, showing a rear thick remnant of a hollow body being formed due to surfaces sticking according to the related art.
Figure 3B:
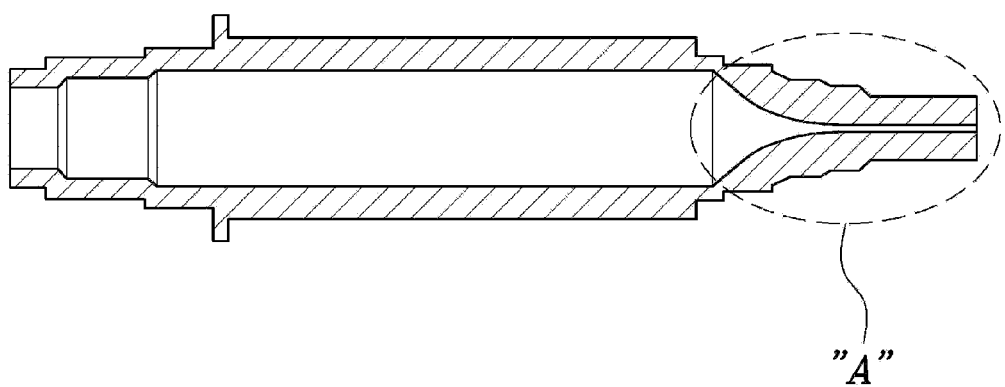

While the present invention will be described in conjunction with exemplary embodiments thereof with reference to the accompanying drawings, the present description is not intended to limit the present invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Throughout the drawings, the same reference numerals will refer to the same or like parts. Thus, components may be described with reference to several drawings.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 4:
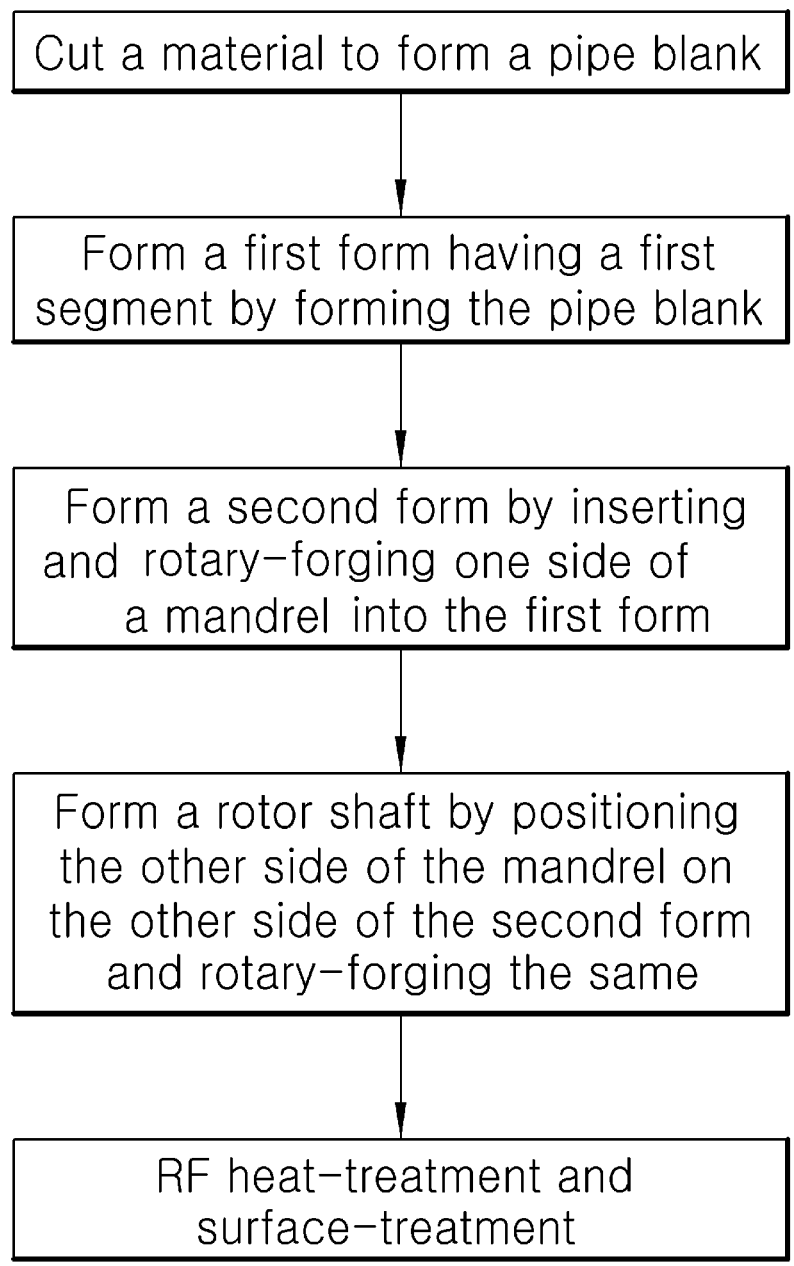
FIG. 4 is an exemplary flow chart showing a procedure of manufacturing a light rotor shaft for eco-friendly vehicles according to an exemplary embodiment of the present invention.
Figure 5:
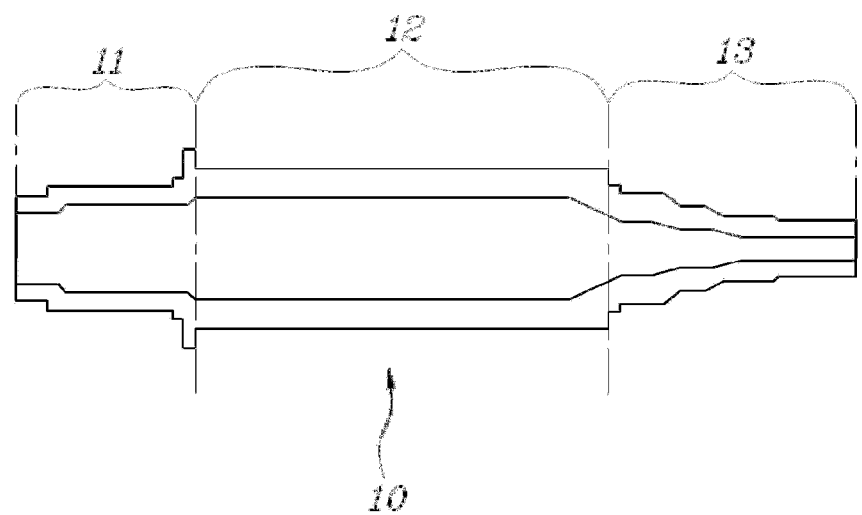
FIG. 5 is an exemplary cross-sectional view of a rotor shaft manufactured by an exemplary embodiment of the method of the present invention.

FIG. 4 is an exemplary flow chart that illustrates a procedure of manufacturing a light rotor shaft for eco-friendly vehicles according to an exemplary embodiment of the present invention, and FIG. 5 is an exemplary cross-sectional view of a rotor shaft manufactured by an exemplary embodiment of the method of the present invention. As shown in FIGS. 4 and 5, a hollow-type rotor shaft may be longitudinally (e.g., vertically) divided into a first segment 11, a second segment 12, and a third segment 13 based on respective outer diameters.

An exemplary embodiment may include a method of manufacturing a light rotor shaft for eco-friendly vehicles by forming the rotor shaft in a hollow form to reduce the weight of the rotor shaft such that an inner diameter corresponds to a variance of an outer diameter, thereby minimizing a rear thick remnant (A). The method of manufacturing a rotor shaft 10 for eco-friendly vehicles may include cutting a pipe blank, forming a first form having a first segment 11, forming a second form by forming a second segment 12 on the first form, and forming the rotor shaft by forming a third segment disposed on an end of the second form.

Furthermore, wherein the cutting process may include, a pipe-like material cut to a specified length, preparing a pipe blank. The pipe blank may be formed to include the first segment 11 on a first side, thereby forming the first form, (e.g., a preform). For example, the first segment 11 may be formed to include a stepped shape such that the shape of the outer diameter and the shape of the inner diameter correspond and the first segment may have a constant thickness. For example, maintaining a sustainably constant thickness of the first segment 11 may prevent a reduction of durability by stress-concentration, and may maximize the weight-reduction of a product.

Additionally, a first side of a mandrel 30 may be inserted and rotated into the first form having the first segment 11, and an outer surface of the first form on the second side may be simultaneously hammer-forged, to form the second form having the second segment 12. In particular, the first side of the mandrel 30 inserted into the first form may have a shape that corresponds to the inner diameter of the first segment 11. Moreover, the second segment 12 may be formed to maintain a sustainably constant thickness which may prevent separation and deformation of the first form.

Figure 6:
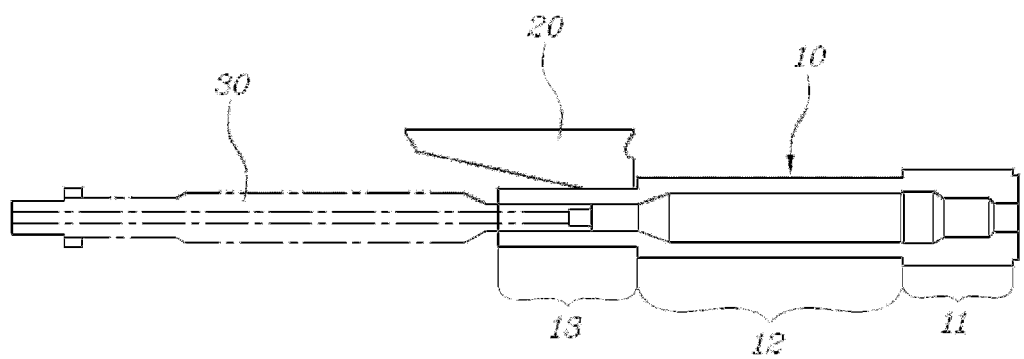
FIG. 6 is an exemplary perspective view showing a third forming stage of an exemplary embodiment of the method of the present invention.

FIG. 6 is an exemplary perspective view showing a third forming stage of an exemplary embodiment of the method of the present invention. As shown in FIG. 6, following formation of the second form, the mandrel 30 may be extracted (e.g., drawn out) to position the opposite side of the mandrel 30 at the second side of the second form.

Concurrently, the outer surface of the second side of the second form may be press-forged by a hammer 20 to forge the third segment 13, thereby forming a rotor shaft.

In particular, the third segment 13 may include a stepped outer diameter, and the press-forging may be performed in multiple stages that correspond to the number of steps of the outer diameter. For example, the second side of the mandrel 30 may have a stepped shape that corresponds to a variance of the outer diameter of the third segment 13 to decrease a diameter thereof towards an end. Further, when the third segment 13 is formed, the mandrel 30 may be extracted (e.g., drawn out) step by step based on a variance of the stepped outer diameter of the third segment 13. Namely, the third segment 13 of the rotor shaft 10 may be formed with a constant thickness, thereby preventing weight-increase and stress-concentration due to the formation of a rear remnant (A) and advantageously improving durability and reducing the weight of the shaft.

In some exemplary embodiments the second and third forming processes may be performed using, for example, a radial forging process, a swaging process, or the like. After the formation of the rotor shaft, an radio frequency (e.g., RF) heat-treatment and a surface treatment such as a short blasting process may be performed on the rotor shaft. The rotor shaft 10 as manufactured according to an exemplary embodiment may provide a weight-reduction by about 40%, 32%, and 37%, respectively, relative to a conventional solid rotor shaft, a conventional hollow rotor shaft, and a conventional partially-hollow rotor shaft, which have the same shape and dimension as the present rotor shaft as manufactured. Further, an exemplary embodiment of the rotor shaft may have approximately a 20%-improved fatigue strength relative to a hollow rotor shaft as manufactured by a conventional forging method. Additionally, as compared to a joint-type shaft formed by welding pre-fabricated opposing ends together, the manufacturing cost may be reduced by about 50%, and, durability may also be improved because a seamless product is produced.

While this invention has been described in connection with what is presently considered to be exemplary embodiments on the contrary, it is intended to cover various modifications and equivalent, without departing from the scope and spirit of the invention as disclosed in the accompanying claims. In addition, it is to be considered that all of these modifications and alterations fall within the scope of the present invention.

What is claimed is:

1. A method of manufacturing a light rotor shaft for eco-friendly vehicles, wherein the rotor shaft includes a hollow main body longitudinally divided into first, second, and third segments, and inner diameters of the first and third segments are less than an inner diameter of the second segment, the method comprising:
    cutting a pipe material in a specified length to form a pipe blank;
    forming the pipe blank to provide a first form having the first segment on a first side;
    forming a second form having the second segment by inserting and rotating a first side of a mandrel into the first side of the first form towards the first segment and hammer-forging a second side of the first form to form the second segment; and
    forming the rotor shaft having the third segment by inserting and rotating a second side of the mandrel into a first side of the second form towards the second segment to form the third segment.

2. The method according to claim 1, wherein the first and third segments have stepped inner and outer diameters that gradually decrease towards respective ends thereof.

3. The method according to claim 2, wherein the inner diameters of the first to third segments are formed to change in dimension corresponding to a variance of the outer diameters of the first to third segments.

4. The method according to claim 2, wherein the first side of the mandrel has a shape corresponding to the inner diameter of the first segment, and the second side of the mandrel has a shape corresponding to the inner diameter of the third segment.

5. The method according to claim 1, further comprising, performing a radio frequency heat-treatment and a surface treatment on the rotor shaft.

* * * * *